(12) United States Patent
Kamemura (10) Patent No.: US 11,066,096 B2
(45) Date of Patent: Jul. 20, 2021

(54) VEHICLE STEERING CONTROL METHOD AND VEHICLE STEERING CONTROL DEVICE

(71) Applicant: Nissan Motor Co., Ltd., Yokohama (JP)

(72) Inventor: Takafumi Kamemura, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 16/971,714

(22) PCT Filed: Mar. 6, 2018

(86) PCT No.: PCT/JP2018/008437
§ 371 (c)(1),
(2) Date: Aug. 21, 2020

(87) PCT Pub. No.: WO2019/171447
PCT Pub. Date: Sep. 12, 2019

(65) Prior Publication Data
US 2020/0391790 A1    Dec. 17, 2020

(51) Int. Cl.
*B62D 6/00* (2006.01)
*B62D 5/04* (2006.01)
*B62D 5/00* (2006.01)

(52) U.S. Cl.
CPC .......... *B62D 5/0463* (2013.01); *B62D 5/006* (2013.01); *B62D 5/043* (2013.01); *B62D 5/0481* (2013.01)

(58) Field of Classification Search
CPC ...... B62D 5/0463; B62D 5/006; B62D 5/043; B62D 5/0481; B62D 5/0457; B62D 1/286; B62D 5/003; B62D 15/025; B62D 6/00
(Continued)

(56) References Cited

U.S. PATENT DOCUMENTS

| 2002/0035424 A1* | 3/2002 | Kaufmann ............. B62D 5/001 701/41 |
| 2005/0045413 A1* | 3/2005 | Shitamitsu ........... B62D 5/0409 180/402 |

(Continued)

FOREIGN PATENT DOCUMENTS

| CN | 106945719 A | 7/2017 |
| CN | 107512305 A | 12/2017 |

(Continued)

*Primary Examiner* — Shardul D Patel
(74) *Attorney, Agent, or Firm* — Global IP Counselors, LLP (57) ABSTRACT

A vehicle steering control method in which steering wheel vibrations are suppressed when a clutch is engaged while turning to suppress a sense of discomfort imparted to the driver. In this method, when transitioning from a steer-by-wire mode under an autonomous driving mode in which a steering clutch, through which a steering wheel and left and right front wheels are mechanically disconnected and connected, is disengaged, to an EPS control mode under a manual driving mode in which the steering clutch is engaged and an assist torque that corresponds to a detected torque from a torque sensor is imparted to the left and right front wheels, the steering clutch is engaged, and the assist torque is limited to a value that corresponds to the detected torque from the torque sensor from when the steering clutch is engaged until a prescribed limitation period has passed.

6 Claims, 8 Drawing Sheets

(58) Field of Classification Search
USPC .......................................................... 701/41
See application file for complete search history.

(56) References Cited

U.S. PATENT DOCUMENTS

| | | | | |
|---|---|---|---|---|
| 2006/0069481 A1* | 3/2006 | Kubota | ................ | B62D 5/0463 |
| | | | | 701/41 |
| 2006/0200289 A1* | 9/2006 | Chino | .................... | B62D 5/006 |
| | | | | 701/41 |
| 2007/0137921 A1* | 6/2007 | Kasahara | ............. | B62D 5/0463 |
| | | | | 180/405 |
| 2008/0185213 A1* | 8/2008 | Mori | ....................... | B62D 5/006 |
| | | | | 180/402 |
| 2016/0152237 A1* | 6/2016 | Takahashi | ............ | B62D 5/0463 |
| | | | | 701/41 |
| 2018/0093701 A1* | 4/2018 | Kodera | ................ | B62D 5/0478 |

FOREIGN PATENT DOCUMENTS

| | | |
|---|---|---|
| CN | 107685765 A | 2/2018 |
| JP | 2003-237607 A | 8/2003 |
| JP | 2009-208551 A | 9/2009 |
| JP | 2011-235891 A | 11/2011 |
| JP | 2014-133531 A | 7/2014 |
| JP | 2015-44479 A | 3/2015 |
| JP | 2015-63244 A | 4/2015 |
| JP | 2017-165128 A | 9/2017 |
| JP | 2017-222356 A | 12/2017 |

* cited by examiner

VEHICLE STEERING CONTROL METHOD AND VEHICLE STEERING CONTROL DEVICE

CROSS-REFERENCE TO RELATED APPLICATIONS

This application is a U.S. national stage application of International Application No. PCT/JP2018/008437, filed on Mar. 6, 2018.

BACKGROUND

Technical Field

The present disclosure relates to a vehicle steering control method and a vehicle steering control device.

Background Information

A device for controlling steering of a vehicle using what is called a steer-by-wire system is hitherto known (e.g., see Japanese Laid-Open Patent Application No. 2015-44479). In this prior art, under normal circumstances, a clutch is placed in a disengaged state in which a steering wheel and turnable wheels are mechanically isolated from one another, and the turnable wheels are turned using drive force from a turning actuator. However, under circumstances in which an abnormal event has occurred, the clutch is placed in an engaged state in which the steering wheel and the turnable wheels are mechanically coupled to one another, and the turnable wheels are turned using steering force from the steering wheel. At such times, a reaction force motor is driven based on detection performed by a torque sensor that detects steering torque acting on the steering wheel, and an assist torque that aids steering of the steering wheel is produced.

SUMMARY

In recent years, devices for controlling autonomous driving have also been proposed. With such devices for controlling autonomous driving, turnable wheels are automatically turned using a turning actuator as in the aforementioned conventional device for controlling steering of a vehicle described above. Thus, it is possible to turn in a state in which hands are off the steering wheel.

However, the present inventors have discovered that the following problem occurs when, during such autonomous driving control, a steer-by-wire system is assessed to be abnormal while a turning angle is being controlled using steer-by-wire control in a state in which the clutch is disengaged, the clutch is engaged, and assisted-control is started from autonomous driving control. Namely, while the aforementioned device for controlling steering of a vehicle is performing autonomous driving control, when in a state in which the hands of the driver are off the steering wheel and the driver subsequently grabs the steering wheel, the steering wheel is sometimes held with little force. For this reason, when the steer-by-wire system is assessed to be abnormal and the clutch is engaged in a state in which the hands of the driver are off the steering wheel, due in part to a variable gear ratio or other setting applied thereto, a difference in angular velocity will arise between the steering-wheel side and turnable-wheels side of the clutch. Thus, in a state in which the steering wheel is held with little force when the driver grabs the steering wheel, if the clutch is engaged in a state in which a difference in angular velocity has arisen between the steering wheel side and the turnable wheels side of the clutch, torsion is produced in a torque sensor provided in a transmission system for steering force from the steering wheel, and vibrations are produced. Due to this vibration of the torque sensor, the steering wheel vibrates when the driver holds the steering wheel with little force, and an assist torque that corresponds to a steering torque that is detected as a result of vibration of the torque sensor is produced. There is a concern that this assist torque will promote more of such vibration and impart a sense of discomfort to the driver.

The present invention focuses on the above problem, it being an object hereof to provide a method and device for controlling steering of a vehicle with which vibration of the steering wheel is suppressed when a clutch is engaged and with which it is possible to suppress a sense of discomfort imparted to the driver.

In order to achieve the above objective, a method and device for controlling steering of a vehicle of the present disclosure have a steer-by-wire mode in which a clutch through which a steering wheel and turnable wheels are able to be mechanically disconnected and connected is disengaged, and a steering angle of the steering wheel and a turning angle of the turnable wheels are controlled based on a turning angle command, and an assisted-control mode in which the clutch is engaged and an assist torque that corresponds to a detected torque from the torque sensor is imparted to the turnable wheels. When transitioning from a steer-by-wire mode under an autonomous driving mode to an assisted-control mode under a manual driving mode, the assist torque is limited to a value that corresponds to the detected torque from when the clutch is engaged until a prescribed limitation period has passed.

In the method for controlling steering of vehicle and device for controlling steering of a vehicle of the present disclosure, when transitioning from a steer-by-wire mode under an autonomous driving mode to an assisted-control mode under a manual driving mode, an output of an assist torque is suppressed at the time of clutch engagement. Accordingly, when the clutch is engaged, even if a torque sensor vibrates, the output of an assist torque that corresponds to a detected torque containing a vibrational component resulting therefrom is suppressed. It is thereby possible to suppress vibration of the steering wheel to a greater extent than when assist torque is not limited immediately following engagement of the clutch.

BRIEF DESCRIPTION OF THE DRAWINGS

Referring now to the attached drawings which form a part of this original disclosure.

DETAILED DESCRIPTION OF EMBODIMENTS

An embodiment of the method and device for controlling steering of a vehicle of the present disclosure is described below based on the drawings. The device for controlling steering of a vehicle is applied in accordance with a first embodiment to a vehicle installed with a steering-by-wire system in which movement of a steering wheel is converted to an electrical signal and transmitted to left and right front wheels. The device for controlling steering of a vehicle of the first embodiment is described below broken down under the sections "Overall System," "Motor/Clutch Control System," and "Fade-in Control."

Overall System

Figure 1:
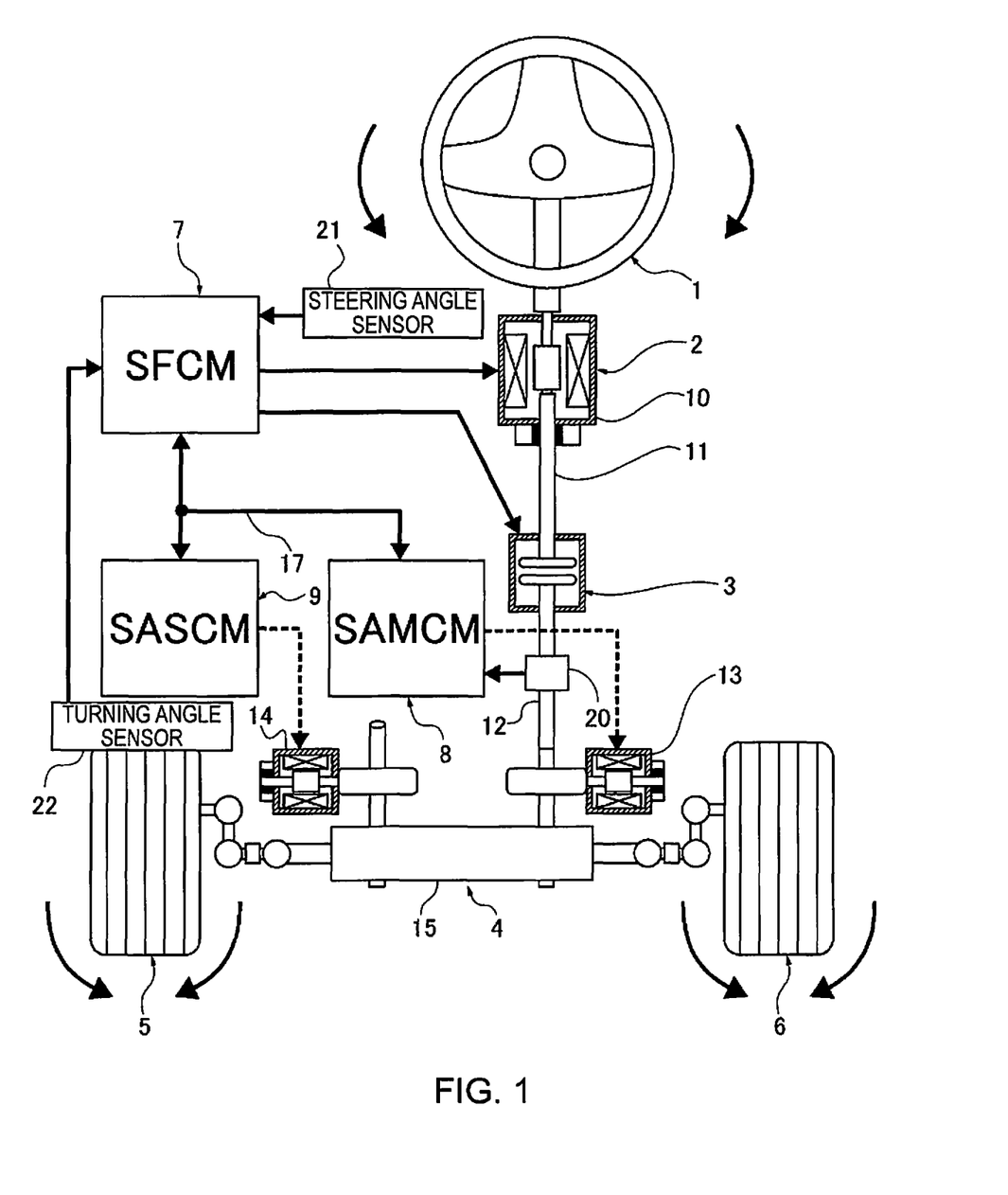
FIG. 1 is an overall system diagram illustrating a steering-by-wire system to which the method and device for controlling steering of a vehicle are applied in accordance with a first embodiment.

FIG. 1 illustrates a steering-by-wire system to which the method and device for controlling steering of a vehicle of the first embodiment are applied. The overall system will be described below with reference to FIG. 1.

In terms of a mechanical system, the steering-by-wire system comprises a steering wheel 1, a steering force actuator 2, a steering clutch 3, a turning actuator 4, and left and right front wheels (turnable wheels) 5, 6.

In terms of a control system, the steering-by-wire system comprises a steering force control module 7, a main turning angle control module 8, and a secondary turning angle control module 9.

The steering force actuator 2 includes a three-phase AC reaction force motor 10 that is capable of inputting torque to the steering wheel 1. The steering force actuator 2 generates, with respect to a steering operation force, torque corresponding to a reaction force from a road surface using drive current from the steering force control module 7 when in a manual driving mode in which steering is manually performed (under normal circumstances). This manual driving mode is a manual driving mode for times when everything is normal, and relates to control in a state in which the steering clutch 3 is disengaged. The steering force actuator 2 functions as a steering actuator that steers the steering wheel 1 in a turning direction when in an autonomous driving mode in which the hands of the driver have been taken off the steering wheel 1.

The steering clutch 3 is an electromagnetic clutch structure. When supplied with electricity from the steering force control module 7, the steering clutch 3 disengages, and upper and lower steering shafts 11, 12 are isolated from one another. When in a system protection mode or when there is a system irregularity, the supply of electricity from the steering force control module 7 is interrupted, the steering clutch 3 is linked, and the upper and lower steering shafts 11, 12 are mechanically coupled to one another.

The turning actuator 4 is an actuator that is capable of turning the left and right front wheels 5, 6, and includes a main turning motor 13, a secondary turning motor 14, and a steering gear mechanism 15. The main turning motor 13 is a three-phase AC motor that generates steering torque using drive current from the main turning angle control module 8. The secondary turning motor 14 is a three-phase AC motor that generates steering torque using drive current from the secondary turning angle control module 9. The steering gear mechanism 15 converts pinion torque to force along a rack axis, causing knuckle arms to rotate and changing the orientation of the left front wheel 5 and the right front wheel 6. When in an assisted-control mode under the manual driving mode, in which steering is performed by the driver when an irregularity has arisen, the turning actuator 4 (described below) imparts an assist torque to steering torque from the steering wheel 1 in a state in which the steering clutch 3 is engaged.

The steering force control module 7, the main turning angle control module 8, and the secondary turning angle control module 9 are connected to so as to be capable of exchanging information with one another via FlexRay communication lines 17.

The steering force control module 7 receives, as inputs, a detected torque from the torque sensor 20, a steering angle detected by a steering angle sensor 21, and a turning angle detected by a turning angle sensor 22.

The torque sensor 20 is provided at the lower steering shaft 12, and detects transmitted torque (axial torque) at the steering shaft 12. As well-known in the art, the torque sensor 20 comprises a torsion bar (not illustrated) with less torsional rigidity than the steering shaft 12, and, based on an amount of torsional displacement of the torsion bar, the torque sensor 20 detects torque in a steering direction that acts on the steering shaft 12.

The steering angle sensor 21 is provided in a transmission system for steering torque from the steering wheel 1, such as at the upper steering shaft 11, and detects a steering angle. The turning angle sensor 22 is provided in a transmission system for turning torque in the vicinity of the steering gear mechanism 15, and detects a turning angle of the left and right front wheels 5, 6.

Motor/Clutch Control System

Next, the motor/clutch control system of the steering-by-wire system of the first embodiment will be described. In the first embodiment, the steering force control module 7, the main turning angle control module 8, and the secondary turning angle control module 9 relate to turning angle control, and these modules execute control in parallel with one another. By performing control in parallel and comparing output values from the control modules 7-9, it is possible to check for the presence of irregularities in the control modules 7-9, and this also allows turning angle control to continue when one of these modules has failed.

The control modules 7-9 will be described below broken down into constituent elements that operate under normal system circumstances (when in the steer-by-wire mode under the autonomous driving mode) and into constituent elements that operate under circumstances in which an abnormal event has occurred (when in the assisted-control mode under the manual driving mode).

Figure 2A:
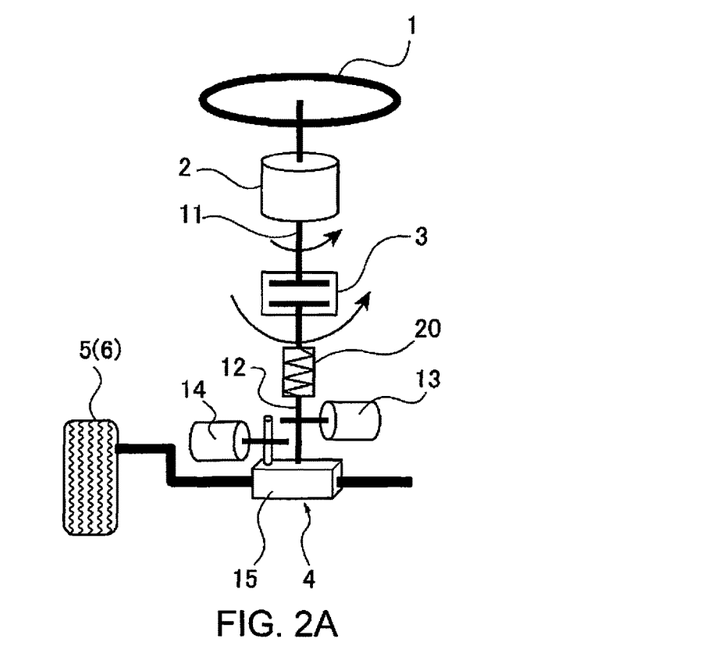
FIG. 2A is a diagram of a mechanical system of the steering-by-wire system under normal system circumstances (when in a steer-by-wire mode under an autonomous driving mode)
Figure 2B:
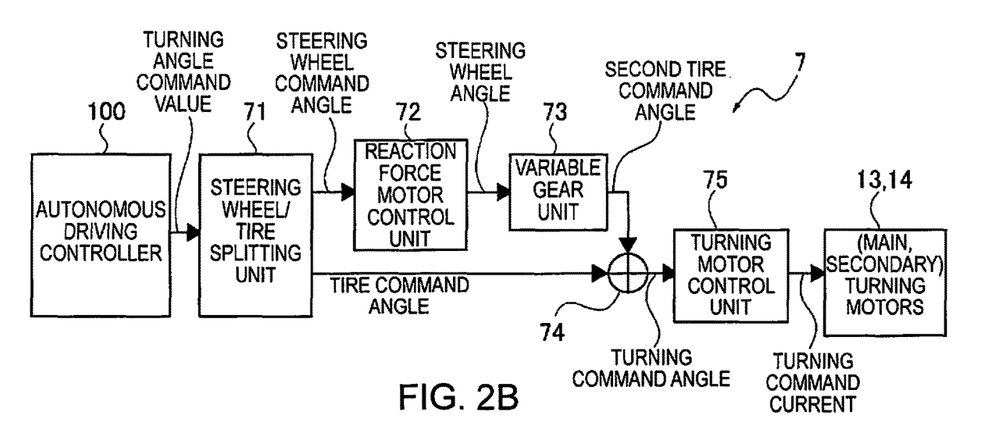
FIG. 2B is a diagram of a motor/clutch control system of a steering force control module, a main turning angle control module, and a secondary turning angle control module that operates under normal system circumstances (when in the steer-by-wire mode under the autonomous driving mode)

First, the constituent elements that operate under normal system circumstances (when in the steer-by-wire mode in the autonomous driving mode) will be described. FIG. 2A is a diagram of the mechanical system of the steering-by-wire system under normal system circumstances (when in the steer-by-wire mode under the autonomous driving mode). FIG. 2B is a diagram of the motor/clutch control system of the steering force control module 7, the main turning angle control module 8, and the secondary turning angle control module 9 that operates under normal circumstances (when in the steer-by-wire mode under the autonomous driving mode).

As illustrated in FIG. 2A, when in the steer-by-wire mode under normal system circumstances, the steering clutch 3 is disengaged and the upper and lower steering shafts 11, 12 are isolated from one another. In the autonomous driving mode, in which steering is not performed by the driver, control is implemented such that the steering wheel 1 is steered by the reaction force motor 10, and the left and right front wheels 5, 6 are turned by the main turning motor 13 and the secondary turning motor 14.

Steering of the steering wheel 1 at such times is mainly performed in order to inform the driver of the turning direction of the left and right front wheels 5, 6. The left and right front wheels 5, 6 are mainly turned by driving the main turning motor 13. The secondary turning motor 14 is driven in cases in which turning requires a large amount of torque. In cases in which one of the turning motors 13, 14 has failed, the other of the motors implements the turning. Thus, driving the turning motors 13, 14 includes cases in which only one of the turning motors 13, 14 is driven, and cases in which both of the turning motors 13, 14 are driven simultaneously. However, the following description will refer simply to driving the turning motors 13, 14 without regard to the state of drive control.

In the steer-by-wire mode, when in a manual driving mode in which the driver has performed steering, control is executed in which the left and right front wheels 5, 6 are turned in accordance with a steering angle from the driver. This is what is known as steer-by-wire control. At the time of steering in the steer-by-wire mode under the manual driving mode, while, with respect to steering of the steering wheel 1, a steering reaction force is imparted by the reaction force motor 10, the turning motors 13, 14 are driven in accordance with the steering angle and the left and right front wheels 5, 6 are turned in accordance with an amount of steer.

When in the autonomous driving mode in which steering is not performed by the driver, the autonomous driving controller 100 illustrated in FIG. 2B controls acceleration, turning, and braking of the vehicle based on information such as for travel conditions and the surrounding environment. Autonomous driving as performed by the autonomous driving controller 100 includes, inter alia, control to travel following a leading vehicle, control to prevent departure from a lane of travel, and control to travel along a pre-set route.

When in the autonomous driving mode, the steering force control module 7 receives, as input, a turning angle command value indicating a turning angle that has been decided upon by the autonomous driving controller 100. The steering force control module 7 and the control modules 8, 9 that control turning angle output, to the reaction force motor 10 and the turning motors 13, 14, turning angle and steering angle command currents that correspond to the turning angle command value. In other words, the autonomous driving controller 100 executes steering control as part of autonomous driving control.

FIG. 2B illustrates the constituent elements of the steering force control module 7 that output command current to the turning motors 13, 14 when in the steer-by-wire mode under the autonomous driving mode under normal system circumstances. As illustrated in FIG. 2B, these constituent elements comprise a steering wheel/tire splitting unit 71, a reaction force motor control unit 72, a variable gear unit 73, an addition unit 74, and a turning motor control unit 75.

The steering wheel/tire splitting unit 71 splits a turning angle command value outputted from the autonomous driving controller 100 into a steering wheel command angle, this being a steering angle for the steering wheel 1, and a tire command angle at which the left and right front wheels 5, 6 are turned.

The steering wheel command angle is a command value at which the reaction force motor 10 is driven in order to actually steer the steering wheel 1 in the turning direction. Having received this steering wheel command angle as input, the reaction force motor control unit 72 drives the reaction force motor 10, whereby the steering wheel 1 is steered.

In other words, the left and right front wheels 5, 6 are turned automatically when in the steer-by-wire mode under the autonomous driving mode, and at such times, the steering wheel 1 is steered (rotated) to visually inform the driver of the turning of the vehicle.

For this reason, in the first embodiment, the relationship between the steering angle of steering wheel 1 and the turning angle of the left and right front wheels 5, 6 when in the autonomous driving mode does not match the relationship therebetween when steering is performed in the steer-by-wire mode in the manual driving mode.

To be more precise, when in the steer-by-wire mode under the autonomous driving mode, steering of the steering wheel 1 is performed for the purpose of informing the driver of the turning direction as described above. For example, driving situations in which the turning angle is large frequently arise when traveling at low speeds, and when in the steer-by-wire mode under the autonomous driving mode, the steering angle of the steering wheel 1 at the time of such turning is controlled so as to be kept lower than the steering angle needed to turn. Further, situations in which a corrective steering angle is applied frequently arise when traveling at high speeds, and because it is not necessary to inform the driver of such corrective steering angles, similarly to above, the steering angle is kept lower than the steering angle needed to turn. Thus, during autonomous driving control, the actual steering angle needed for a turn is split into the steering angle and turning angle described above so as to keep the steering angle of the steering wheel 1 low. The ratio of the split between the steering angle and the turning angle is not fixed, and is controlled so as to vary according to travel conditions.

The variable gear unit 73 imparts a prescribed gear ratio to the turning angle of left and right front wheels 5, 6 with respect to the steering angle of the steering wheel 1. In the steer-by-wire mode under the manual driving mode, the variable gear unit 73 performs control so that, according to vehicle speed, the turning angle has a prescribed relationship to the steering angle, and in the autonomous driving mode, performs control for the purpose of visually informing the driver of the direction of a turning angle and the magnitude of the angle as described above. The relationship between the turning angle and the steering angle in such cases is stored ahead of time as a map or as a mathematical formula.

The addition unit 74 adds a tire command angle outputted from the variable gear unit 73 and a second tire command angle outputted from the steering wheel/tire splitting unit 71, and outputs the sum thereof to the turning motor control unit 75 as a final turning command current. The turning motor control unit 75 outputs, to the turning motors 13, 14, a turning command current to turn the left and right front wheels 5, 6 at an angle that corresponds to a turning command angle.

Figure 3A:
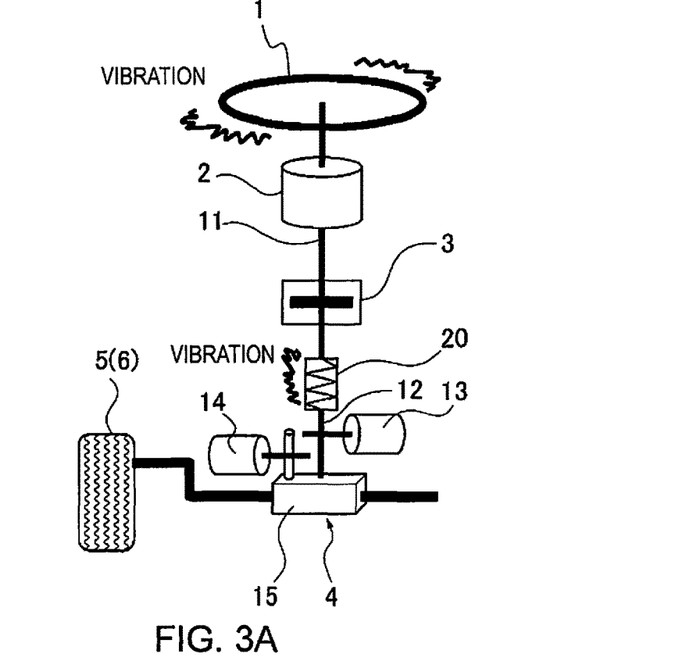
FIG. 3A is diagram of the mechanical system of the steering-by-wire system when transitioning from the steer-by-wire mode under the autonomous driving mode to an assisted-control mode under a manual driving mode (under circumstances in which an abnormal event has occurred)
Figure 3B:
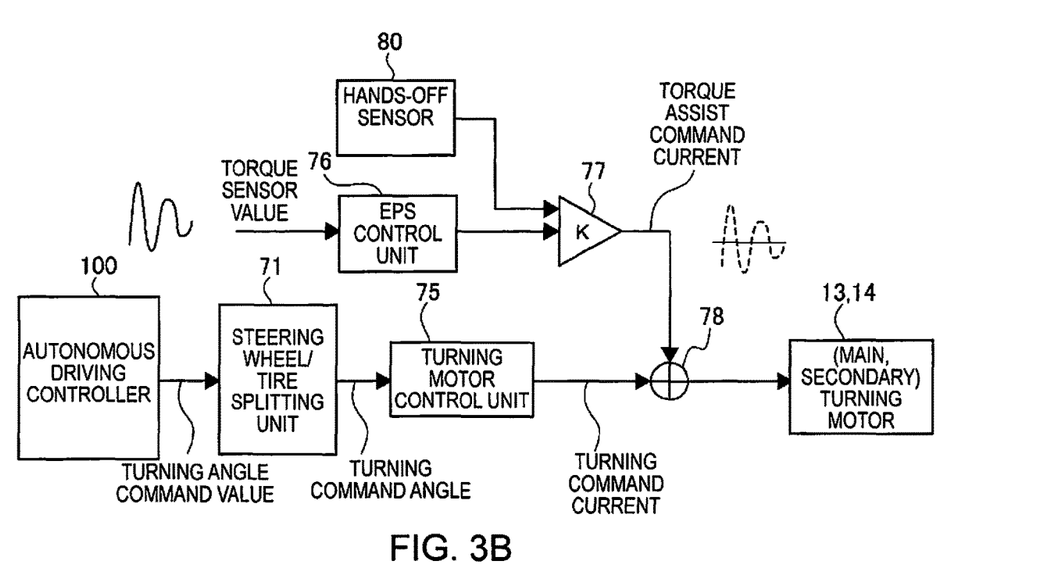
FIG. 3B is a diagram of the motor/clutch control system of the steering force control module, the main turning angle control module, and the secondary turning angle control module that operates under circumstances in which an abnormal event has occurred (when in the assisted-control mode)

Next, the constituent elements of the steering force control module 7 and the turning angle control modules 8, 9 that operate under circumstances in which an abnormal event has occurred (when in the assisted-control mode in the manual driving mode) will be described.

As illustrated in FIG. 3B, as the constituent elements operating under circumstances in which an abnormal event has occurred, the steering force control module 7 and the turning angle control modules 8, 9 comprise a power-assist control unit 76 (hereafter referred to as EPS control unit 76), a gain adjustment unit 77, and a second addition unit 78.

In the autonomous driving mode, in cases in which some sort of irregularity has arisen in the motor/clutch control system, the EPS control unit 76 performs control to transition to the assisted-control mode (hereafter, EPS control mode). In the EPS control mode, the steering clutch 3 is engaged, after which steering by the driver is aided in accordance with a detected torque from the torque sensor 20. In other words, to the turning command current outputted from the turning motor control unit 75 according to the turning angle command value from the autonomous driving controller 100, the EPS control unit 76 further adds a torque assist command current with the second addition unit 78, whereby steering torque is supplemented and reduced.

The gain adjustment unit 77 multiplies an assist torque signal outputted from the EPS control unit 76 by a gain k (coefficient) less than or equal to one. In other words, in the first embodiment, fade-in control is executed in which assist torque is limited from the time of a transition to the EPS control mode (clutch engagement) until a fade-in period (limitation period), described below, has passed, and after the fade-in period has passed, the limitation is lifted. In such fade-in control, assist torque is limited to a value less than a value that corresponds to a detected torque from the torque sensor 20, and at a point in time at which the fade-in period has passed, the limitation is lifted and the assist torque is set to a value that corresponds to the detected torque. In more specific terms, assist torque is gradually increased from 0% to 100% of a value that corresponds to a detected torque from the torque sensor 20 as the fade-in period passes.

The gain adjustment unit 77 multiplies a value for an assist torque that corresponds to a detected torque from the torque sensor 20 by a gain k that increases from zero to one.

When, based on detection by a hands-off sensor 80, the hands of the driver are off the steering wheel 1, the gain adjustment unit 77 sets the fade-in period so as to be longer than cases in which a hand is in contact with the steering wheel 1 (hands-on cases). In other words, the duration over which assist torque is limited is set longer when the hands are off the steering wheel 1 than when the steering wheel 1 is being held or touched.

The hands-off sensor 80 detects whether or not the hands of the driver are off the steering wheel 1 (hands-on: the steering wheel 1 is being held or is in contact with a hand). The hands-off detection performed by the hands-off sensor 80 can be implemented using a touch sensor provided to the steering wheel 1, for example, or this detection can be implemented by detecting when a magnitude of a steering reaction force is less than or equal to a prescribed value. This detection can also be implemented by detecting a change in steering angle, a change in a motor current of the reaction force motor 10, a change in a detected torque value from the torque sensor 20, etc.

The second addition unit 78 adds an output from the turning motor control unit 75 and an output from the gain adjustment unit 77. In cases in which a failure has occurred in some part of the system and/or control is temporarily suspended, an abnormal event is determined to have occurred, and a transition is made to the assisted-control mode under the manual driving mode, the turning angle control performed by the autonomous driving controller 100 is not immediately discontinued, but is continued for a prescribed amount of time. This period of continuation is, for example, on the order of several seconds.

Accordingly, when transitioning from the steer-by-wire mode under the autonomous driving mode to the assisted-control mode under the manual driving mode, the second addition unit 78 adds the output from the turning motor control unit 75 and the output from the gain adjustment unit 77. In other words, while the autonomous driving controller 100 continues to output a turning angle command value, a turning angle command current based on autonomous driving control and a torque assist command current based on EPS control are added together by the second addition unit 78. Command current for a turning angle based on this sum is then outputted to the turning motors 13, 14. When the prescribed amount of time has passed and the autonomous driving controller 100 has stopped outputting the turning angle command value, a move is made to EPS control in the manual driving mode in which only the torque assist command current based on the EPS control mode is outputted to the turning motors 13, 14. Depending on the circumstances of the irregularity, it could be the case that control continues to be performed by the autonomous driving controller 100 and no move is made to EPS control in the manual driving mode in which the steering clutch 3 is engaged. Conversely, depending on the circumstances of the irregularity, it could also be the case that output of the torque assist command current to the turning motors 13, 14, in other words, output of the assist torque, is stopped.

Fade-in Control

Fade-in control will be described below. As described above, in the steer-by-wire mode under the autonomous driving mode, under normal circumstances, the steering clutch 3 is disengaged and the upper and lower steering shafts 11, 12 are isolated from one another as illustrated in FIG. 2A. The reaction force motor 10 and the turning motors 13, 14 are then driven based on a turning angle command value decided upon by the autonomous driving controller 100. This causes the left and right front wheels 5, 6 to turn as necessary, and causes the steering wheel 1 to be steered such that the turning direction is made clear.

However, under circumstances in which an abnormal event has occurred, a transition is made to the EPS control mode (assisted-control mode) of the manual driving mode. As illustrated in FIG. 3A, at the time of a transition to the EPS control mode under the manual driving mode, the steering clutch 3 is engaged and the upper and lower steering shafts 11, 12 are directly connected to one another. At the same time as, or prior to, engagement of the steering clutch 3, via an alarm, an indicator, etc., the driver is given a notification for encouraging the driver to perform manual steering, and the driver is informed that there is an irregularity in the system. Circumstances in which an abnormal event has occurred include cases in which a failure has occurred in one of the sensors or the motors, or in which the temperature of one of the sensors or the motors has risen and the operation thereof is temporarily limited.

In the EPS control mode, in cases in which the driver has steered the steering wheel 1, steering torque therefrom is detected by the torque sensor 20, then in accordance with the detected torque, the turning motors 13, 14 are driven, an assist torque is generated, and the steering torque is reduced.

Further, in the first embodiment, at the time of a transition from the steer-by-wire mode under the autonomous driving mode to the EPS control mode under the manual driving mode, the aforementioned fade-in control is executed, and the timing at which the assist torque reaches a value that corresponds to the detected torque from the torque sensor 20 is delayed.

Figure 4:
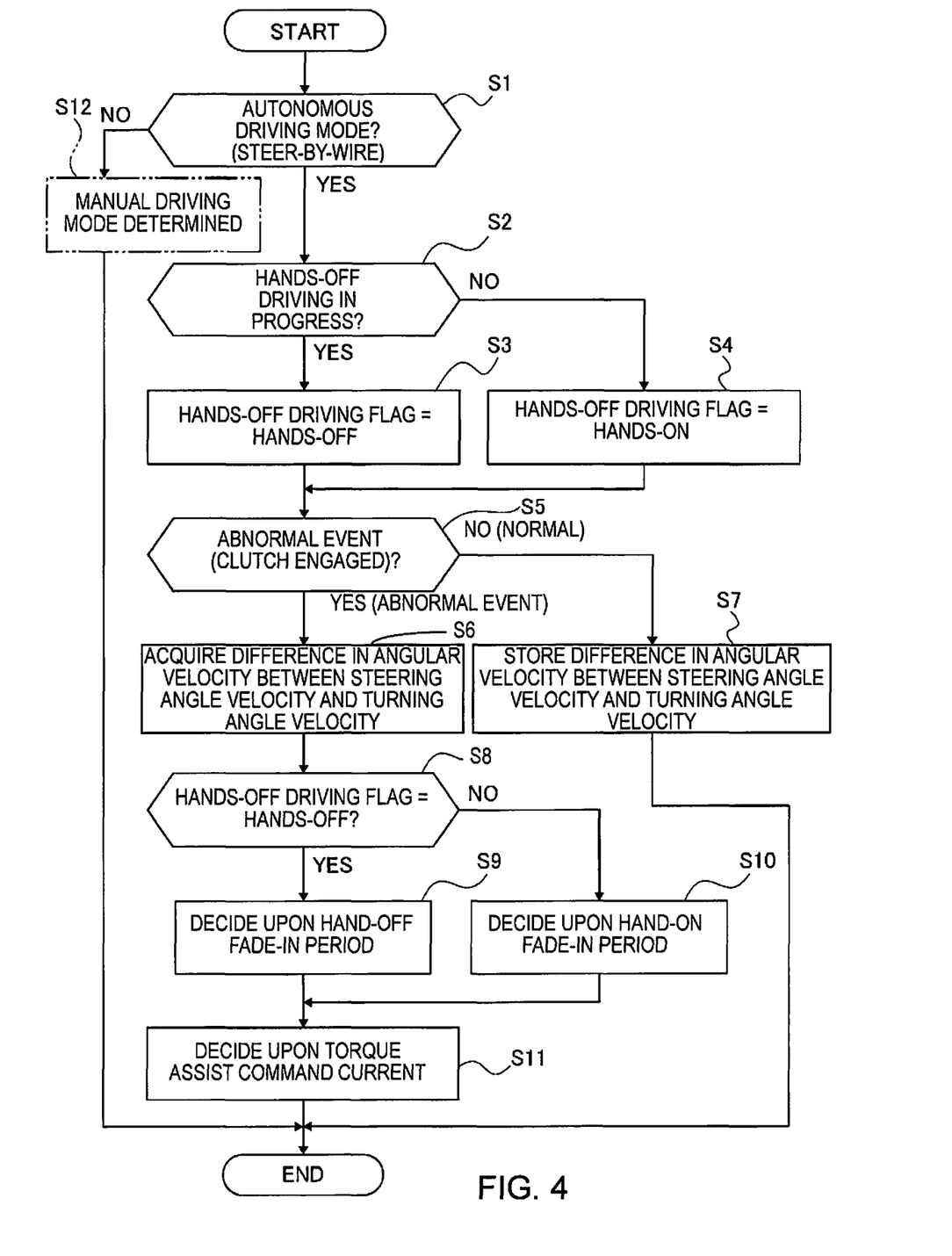
FIG. 4 is a flowchart illustrating the flow of a process for controlling fade-in in an EPS control unit.

The flow of a process for controlling fade-in will be described with reference to the flowchart in FIG. 4. The process for controlling fade-in illustrated in FIG. 4 is repeatedly executed at a prescribed frequency (for example, every 30 ms) during travel. First, in step S1, a determination is made as to whether or not the autonomous driving mode, in which steering is not performed by the driver, is currently engaged. If the autonomous driving mode is engaged, the process advances to step S2, and if the autonomous driving mode is not engaged, the process ends. When in the autonomous driving mode, under normal circumstances, steering control is implemented using the steer-by-wire mode. When not in the autonomous driving mode (in cases in which the determination at step S1 is NO), it is determined that steering control is being implemented using the manual driving mode under normal circumstances.

The process advances to step S2 when in the steer-by-wire mode while the autonomous driving mode is engaged. In step S2, a determination is made as to whether or not hands-off driving is currently in progress based on detection by the hands-off sensor 80. If hands-off driving is in progress, the process advances to step S3 and sets a hands-off driving flag to "hands-off." If hands-off driving is not in progress at step S2, the process advances to step S4 and sets the hands-off driving flag to "hands-on." The determination as to whether or not hands-off driving is in progress is made based on detection by the hands-off sensor 80. "Hands-on" refers to a state in which, although steering is not being performed by the driver, the steering wheel 1 is in contact with a hand of the driver or is being held by the driver.

Following steps S3 and S4, in step S5, a determination is made as to whether or not an abnormal event has occurred. The process advances to step S6 under circumstances in which an abnormal event has occurred, and advances to step S7 under normal circumstances. As mentioned above, abnormal events include cases in which a failure has occurred some part of the system, and cases in which due to rise in a temperature of the motors 10, 13, 14, a battery (not illustrated), etc., driving of the motors or the like is partially stopped, temporarily, until this temperature drops.

The process advances to step S7 when at step S5 it has been determined that circumstances are normal. In step S7, processing is performed that stores an angular velocity difference between a steering angle velocity on the steering wheel 1 side of the steering clutch 3 and a turning angle velocity on the steering gear mechanism 15 side of the steering clutch 3. Subsequently, the process ends. Steering angle velocity is determined based on detection values from the steering angle sensor 21. Turning angle velocity is determined based on detection values from the turning angle sensor 22.

Figure 5:
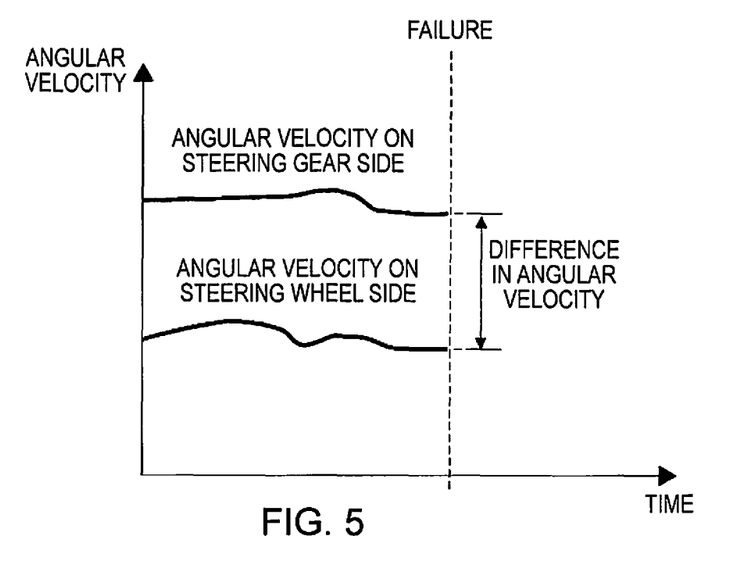
FIG. 5 is a diagram illustrating differences in angular velocity between a steering wheel side and a steering gear side of a clutch in the first embodiment.

FIG. 5 is a diagram showing differences in angular velocity (turning angle velocity) on the steering gear mechanism 15 side of the steering clutch 3 and angular velocity (steering angle velocity) on the steering wheel 1 side of the steering clutch 3. As mentioned above, in a state in which the steering clutch 3 is disengaged, when turning, a difference in angular velocity arises between the angular velocity (steering angle velocity) on the steering wheel 1 side of the steering clutch 3 and the angular velocity (turning angle velocity) on the steering gear mechanism 15 side of the steering clutch 3. In step S7, the most recent difference in angular velocity at that point in time is stored.

The process advances to step S6 when at step S5 it has been determined that an abnormal event has occurred (a transition is made to the EPS control mode under the manual driving mode). In step S6, the most recent angular velocity difference between steering angle velocity and turning angle velocity currently being stored is acquired, and the process advances to step S8. At the time of a transition to the EPS control mode due to it having been determined that an abnormal event has occurred, the steering clutch 3 is immediately engaged through control that is implemented in parallel with fade-in control. Following step S6, in step S8, a determination is made as to whether or not the current hands-off driving flag is set to "hands-off." In cases in which the hands-off driving flag is set to "hands-off," the process advances to step S9 and a hands-off fade-in period is decided upon. However, in cases in which the hands-off driving flag is set to "hands-on," the process advances to step S10 and a hands-on fade-in period is decided upon.

Figure 6:
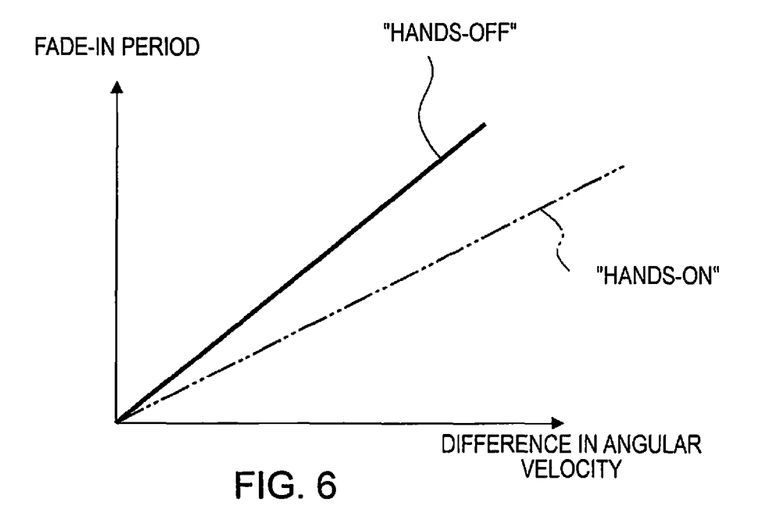
FIG. 6 is a feed-in period attribute chart illustrating hands-off fade-in periods and hands-on fade-in periods corresponding to differences in angular velocity in the first embodiment.
Figure 7:
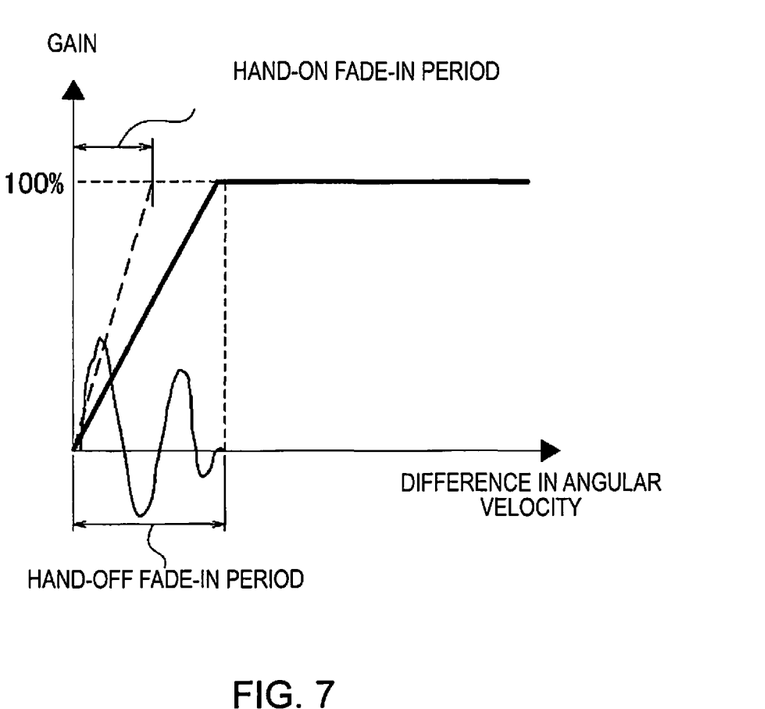
FIG. 7 is a gain attribute chart illustrating changes in gain for an assist torque after the start of an EPS control mode the first embodiment.

The hands-off fade-in period and the hands-on fade-in period are set based on the map illustrated in FIG. 6, or on a mathematical formula, in accordance with the difference in angular velocity. FIG. 6 illustrates relationships between the hands-off fade-in period, the hands-on fade-in period, and differences in angular velocity. In FIG. 6, the hands-off fade-in period and the hands-on fade-in period are set longer for greater differences in angular velocity. In relation to a given difference in angular velocity, the duration (fade-in period) of the hands-off fade-in period is set longer than that of the hands-on fade-in period.

The hands-off fade-in period and the hands-on fade-in period are durations over which the assist torque is limited to a value that corresponds to an assist torque signal outputted from the EPS control unit 76. During the time that the assist torque is limited, the assist torque is controlled so as to reach a value that is less than 100% of a value that corresponds to the assist torque signal outputted from the EPS control unit 76.

The process advances to step S11 after deciding upon the hands-off fade-in period or the hands-on fade-in period in either step S9 or step S10. In step S11, in accordance with one of these fade-in periods, a torque assist command current is decided upon.

Namely, the gain adjustment unit 77 illustrated in FIG. 3B multiplies an assist torque outputted from the EPS control unit 76 by a gain k to decide upon a torque assist command current. The gain k is linearly increased such that the assist torque, at the time of starting to transition to the EPS control mode, is set to 0% of a value that corresponds to an assist torque signal outputted from the EPS control unit 76, and at the point in time that the respective fade-in period has passed, is set to 100% of the value that corresponds to the assist torque signal.

Operation of the First Embodiment

The operation of the method and device for controlling steering of a vehicle of the first embodiment will be described below. In the description of the operation, first, the problem solved by the method and device for controlling steering of a vehicle of the first embodiment will be described with reference to a comparative example.

The comparative example is an example configured such that, at the time of a transition to the EPS control mode following an irregularity arising while in the steer-by-wire mode under the autonomous driving mode, assist torque is immediately outputted at a value responsive to detected torque from the torque sensor 20 (output from the EPS control unit 76).

While the turning angle is being controlled in the autonomous driving mode, a difference in angular velocity arises between the steering angle velocity on the steering wheel 1 side and the turning angle velocity on the steering gear mechanism 15 side (see FIG. 5).

In this state, if an irregularity arises and, due to it having been determined that an abnormal event has occurred, a transition is made to the EPS control mode and the steering clutch 3 is engaged, a torsional reaction force is produced in the torsion bar (not illustrated) of the torque sensor 20 and vibrations are produced in the torque sensor 20 (see FIG. 3B).

Figure 8:
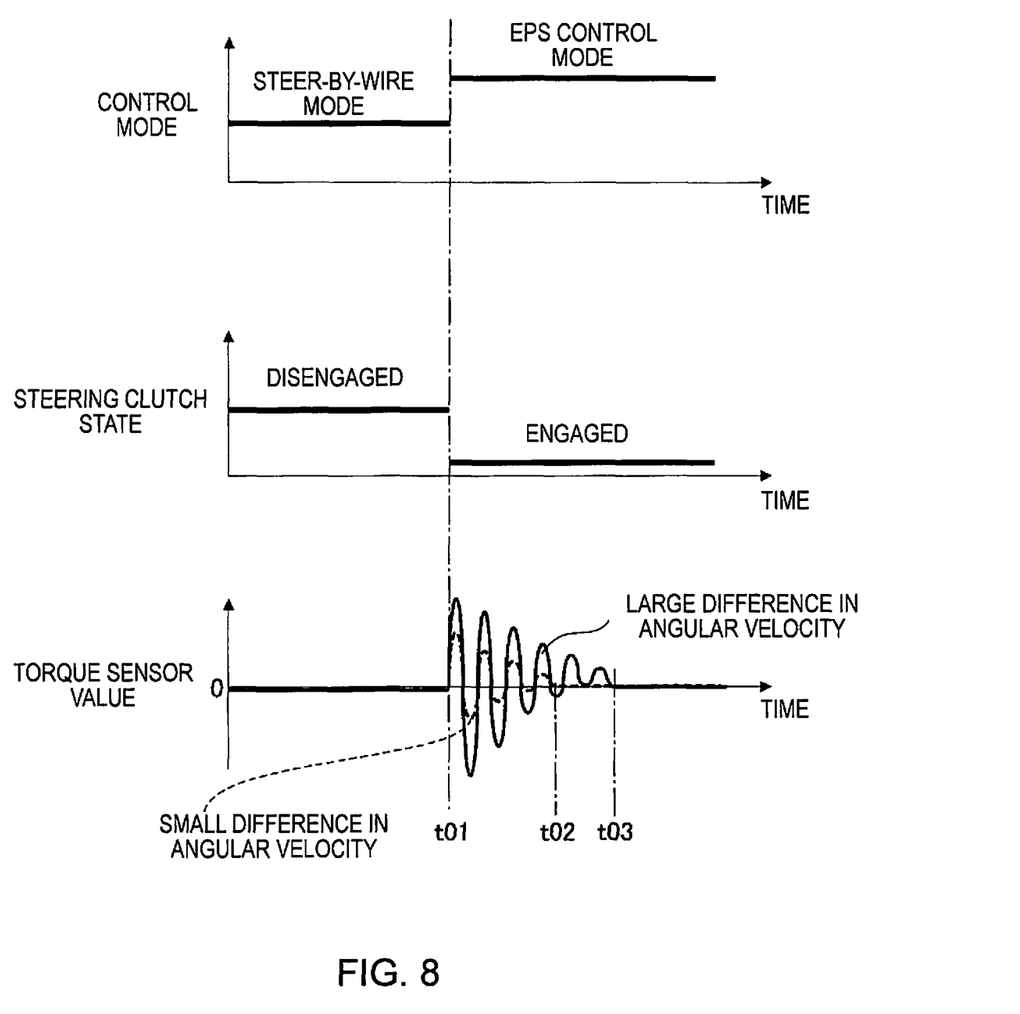
FIG. 8 shows time charts illustrating an example of operation of a comparative example with respect to the first embodiment.

FIG. 8 is a time chart illustrating operational states of the comparative example. At time t01, a transition is made from the steer-by-wire mode to the EPS control mode, and at this point in time the steering clutch 3, which had been in a disengaged state, is engaged. Accordingly, from time t01, vibrations are produced in the torque sensor 20 and detected torque from the torque sensor 20 changes in the manner illustrated. Because the amplitude of vibration is increased and the duration over which vibration occurs is increased the greater the difference in angular velocity, whereas vibrations settle at time t02 in cases in which the difference in angular velocity is relatively small, vibrations settle at time t03, which comes after time t02, in cases in which the difference in angular velocity is relatively large.

In cases in which an assist torque has been produced that is 100% of a value that corresponds to the detected torque from the torque sensor 20, due to the vibrations produced in the torque sensor 20 and the assist torque produced in accordance with the detected torque, vibrations such as illustrated in FIG. 3A are produced in the steering wheel 1. Small vibrations are similarly produced in the left and right front wheels 5, 6 due to the vibrations produced in the torque sensor 20 and the assist torque. Accordingly, in the comparative example, there is a concern that such vibration of the steering wheel 1 and vibration of the left and right front wheels 5, 6 will impart a sense of discomfort to the driver.

Next, the first embodiment will be described with reference to a case in which a transition is made from the steer-by-wire mode under the autonomous driving mode, in which steering is not performed by the driver, to the EPS control mode under the manual driving mode, in which steering is performed by the driver. In the first embodiment, at the time of a transition to the EPS control mode from the steer-by-wire mode while the autonomous driving mode is engaged, the most recently stored difference in angular velocity between the steering angle velocity on the steering wheel 1 side and the turning angle velocity on the steering gear mechanism 15 side is acquired (S6). Then, in accordance with this difference in angular velocity, a hands-off fade-in period is decided upon when the hands of the driver are not in contact with the steering wheel 1, and a hands-on fade-in period is decided upon when a hand of the driver is in contact with the steering wheel 1.

Figure 9:
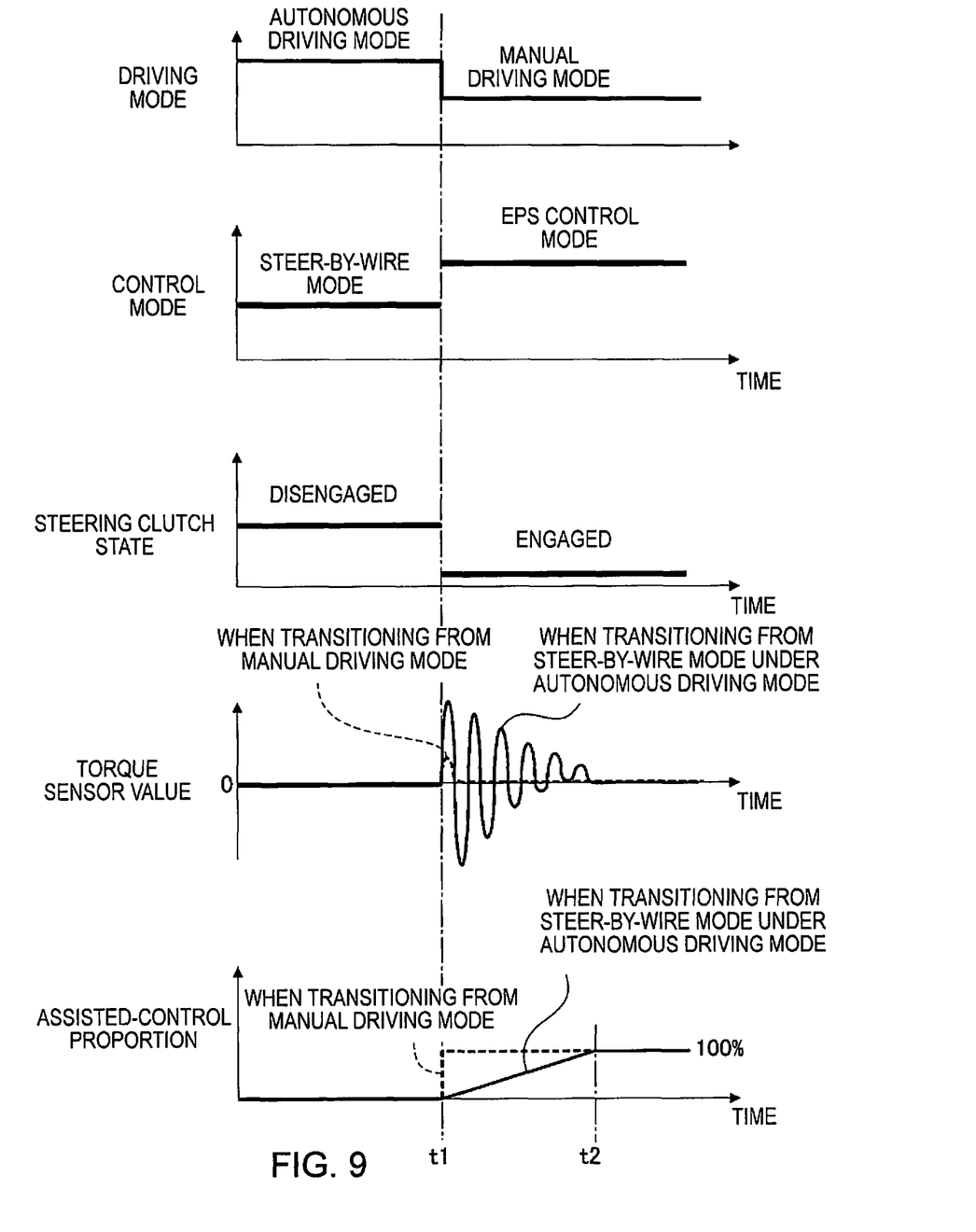
FIG. 9 shows time charts illustrating an example of operation of the first embodiment.

FIG. 9 shows time charts for an example of operation for the first embodiment. In the example of operation illustrated in FIG. 9, the steering clutch 3 is engaged following an irregularity arising at time t1, whereby similarly to in the comparative example, vibrations are produced in the torque sensor 20 due to the difference in angular velocity between the steering angle velocity and the turning angle velocity, and the detected torque (torque sensor value) begins to fluctuate. This torque sensor value expresses only a high-frequency component, which is a vibrational component.

Here, in the first embodiment, at time t1, at which a transition is made to the EPS control mode, assist torque is limited with respect to the output of the EPS control unit 76 that corresponds to the detection by the torque sensor 20. In other words, at time t1, at which a transition is made to the EPS control mode, assist torque is set to 0% of the output of the EPS control unit 76.

Thereafter, as the fade-in period passes, the assist torque is gradually raised by gradually raising the gain k by which the output of the EPS control unit 76 is multiplied. Then, after the vibration of the torque sensor 20 has subsided, at time t2 (the point in time at which the fade-in period has passed), the assist torque is set to 100% of the output of the EPS control unit 76.

Accordingly, at the steering wheel 1, the addition, to this assist torque, of an assist torque containing a vibrational component from the torque sensor 20 is limited, and vibrations are able to be suppressed compared to the comparative example. Similarly, due to limiting assist torque from the turning motors 13, 14 to a value that is less than 100% of the output of the EPS control unit 76, small vibrations in the left and right front wheels 5, 6 are also suppressed. Thus, because vibration of the steering wheel 1 and vibration of the left and right front wheels 5, 6 immediately following engagement of the steering clutch 3 is able to be suppressed, it is also possible to suppress a sense of discomfort from being imparted to the driver.

Moreover, as illustrated in FIG. 6, duration from time t1 to time t2 over which the assist torque is so limited (the fade-in period), is decided upon in accordance with the difference in angular velocity between the steering angle velocity and the turning angle velocity. In other words, the greater the difference in angular velocity between the angular velocity (steering angle velocity) on the steering wheel 1 side of the steering clutch 3 and the angular velocity (turning angle velocity) on the left and right front wheels 5, 6 side of the steering clutch 3, the greater the torsion, i.e., vibration of the torque sensor 20, and the longer the settling time thereof. As such, by ensuring longer periods over which assist torque is limited for greater differences in angular velocity, the aforementioned vibration of the steering wheel 1 and vibration of the left and right front wheels 5, 6 caused by vibration of the torque sensor 20 can be more reliably suppressed.

In addition, when limiting the assist torque, the gain k by which the output of the EPS control unit 76, this being a value that corresponds to a detected torque from the torque sensor 20, is multiplied is gradually increased, and assist torque is gradually increased. Accordingly, because the assist torque is gradually increased based on EPS control, for example, compared to a case in which the assist torque suddenly changes from 0% to 100% of the output of the EPS control unit 76 at time t2, the sense of discomfort that would be imparted to the driver by such a sudden rise in the assist torque can be suppressed.

Furthermore, in cases in which a hand of the driver is in contact with the steering wheel 1 at time t1, at which the steering clutch 3 is engaged, along with vibration of the steering wheel 1 due to the hands of the driver being suppressed and the amplitude thereof being reduced, the duration of vibration is shortened, and vibrations are made less visible. For this reason, in the first embodiment, the hands-on fade-in period is set shorter than the hands-off fade-in period. It is thereby possible to suppress a sense of discomfort from being imparted to the driver by vibration of the steering wheel 1 and vibration of the left and right front wheels 5, 6 while reducing an amount of delay in EPS control-based assistance.

Moreover, in cases in which autonomous driving control has been cancelled and the manual driving mode, in which the driver manually steers the steering wheel 1, has been set prior to time t1, at which the steering clutch 3 is engaged, no hands-on fade-in period is set, and assist torque is output at a value that is 100% of the output of the EPS control unit 76 at time t1 (FIG. 9). In other words, in cases in which, when in the manual driving mode (under normal circumstances), a NO determination is made in step S1 of the flowchart in FIG. 4 (determined to be in the manual driving mode in S12), fade-in control (limitation of the assist torque) is not executed.

To be more precise, the steering wheel 1 is already being operated manually by the driver, and even if the steering clutch 3 were engaged, vibration of the steering wheel 1 immediately following this engagement does not readily occur, and so the assist torque is immediately outputted at a 100% value at time t1.

Thus, in cases in which the driver is steering, fluctuations in the detected torque from the torque sensor 20 are suppressed, as illustrated, by steering torque from the driver, fluctuations in the detected torque from the torque sensor 20 are reduced, and the duration of such fluctuations is shortened. As such, even if the assist torque after the time of transition the EPS control mode were set to a value that is 100% of the output of the EPS control unit 76, vibration of the steering wheel 1 and vibration of the left and right front wheels 5, 6 would largely not be produced, and a sense of discomfort would not be imparted to riders. It is thereby possible to suppress a sense of discomfort from being imparted to the driver by vibration of the steering wheel 1 while eliminating delay in EPS control-based assistance.

The effects of the method and device for controlling steering of a vehicle of the first embodiment are listed below.

1) The vehicle steering control method of the first embodiment is used in a vehicle having:
a steering wheel 1,
a steering clutch 3 through which the steering wheel 1 and left and right front wheels 5, 6 are able to be mechanically disconnected and connected,
a reaction force motor 10, serving a steering actuator that imparts torque to the steering wheel 1,
a main turning motor 13 and a secondary turning motor 14 that cause the left and right front wheels 5, 6 to turn, and
a torque sensor 20 that detects a transmitted torque in a torque transmission system between the steering wheel 1 and the left and right front wheels 5, 6,
the method comprising:
a steer-by-wire mode in which the steering clutch 3 is disengaged and a steering angle of the steering wheel 1 and a turning angle of the left and right front wheels 5, 6 are controlled based on a turning angle command, and an EPS control mode in which the steering clutch 3 is engaged and an assist torque that corresponds to a detected torque from, the torque sensor 20 is imparted to the left and right front wheels 5, 6; and
the method being such that:
when transitioning from the steer-by-wire mode under an autonomous driving mode in which steering is not performed by a driver to the EPS control mode under a manual driving mode in which steering is performed by the driver, the assist torque is limited to a value that corresponds to the detected torque from the torque sensor 20 from when the steering clutch 3 is engaged until a fade-in period has passed (t1 to t2 in FIG. 9).

Accordingly, vibration of the steering wheel 1 and vibration of the left and right front wheels 5, 6 immediately following engagement of the steering clutch 3 is suppressed, and it is possible to suppress a sense of discomfort from being imparted to the driver.

2) The vehicle steering control method of the first embodiment, wherein the fade-in period is a duration that corresponds to a difference in angular velocity between a steering angle velocity and a turning angle velocity, the steering angle velocity being angular velocity on the steering wheel 1 side of the steering clutch 3, and the turning angle velocity being angular velocity on the left and right front wheels 5, 6 side of the steering clutch 3. In other words, the magnitude and duration of vibration of the torque sensor 20 correspond to the difference in angular velocity. Accordingly, by limiting the assist torque in accordance with the difference in angular velocity, it is possible to shorten the duration over which the assist torque is limited while more reliably suppressing vibration of the steering wheel 1 and vibration of the left and right front wheels 5, 6 caused by vibration of the torque sensor 20.

3) The vehicle steering control method of the first embodiment, wherein a determination is made as to whether or not a hand of the driver is in contact with the steering wheel 1 (S2 in FIG. 4), and in cases in which it has been determined that a hand of the driver is in contact with the steering wheel 1 (S10 in FIG. 4), the fade-in period is set shorter than in cases in which it has been determined that the hands of the driver are not in contact with the steering wheel 1 (S9 in FIG. 4). Accordingly, in cases in which a hand of the driver is in contact with the steering wheel 1 and vibrations do not readily occur in the torque sensor 20 at the time of engagement, the fade-in period is shortened, and the duration over which the assist torque from EPS control is limited can be further shortened.

4) The vehicle steering control method of the first embodiment, wherein in cases in which the manual driving mode, in which steering is performed by the driver, is employed prior to engagement of the steering clutch 3, the assist torque, upon engagement of the steering clutch 3, is immediately set to a value that corresponds to the detected torque from the torque sensor 20 without the limiting being performed (is set to a value obtained as a result of not limiting output from an EPS control unit 76). Accordingly, while the driver is steering, the difference in angular velocity at the steering clutch 3 will be small, or, even if an angular velocity difference is produced, vibration of the torque sensor 20 will be suppressed by the steering of the driver. As such, even when the assist torque is not limited immediately following engagement of the steering clutch 3, the assist torque will not contribute to vibration of the steering wheel 1 or the left and right front wheels 5, 6. It is thereby possible to eliminate delay in EPS control-based assistance.

5) The vehicle steering control method of the first embodiment, wherein the limitation of the assist torque is gradually lifted during the fade-in period. Accordingly, it is possible to suppress the sense of discomfort that would be caused by the limitation of the assist torque being suddenly lifted and the assist torque suddenly changing when the fade-in period has passed.

6) The vehicle steering control method of the first embodiment, wherein the assist torque is decided upon by multiplying the value that corresponds to the detected torque from the torque sensor 20 by a gain k that is less than or equal to one, and the gain k is gradually increased from zero to one during the fade-in period. Accordingly, it is possible to smoothly raise the assist torque moving toward the point in time at which the fade-in period ends, at which point a 100% proportion is reached, and it is possible to suppress the sense of discomfort caused by such change in the assist torque.

7) The device for controlling steering of a vehicle of the first embodiment, comprising:
a steering wheel 1;
a steering clutch 3 through which the steering wheel 1 and left and right front wheels 5, 6 are able to be mechanically disconnected and connected;
a reaction force motor 10, serving a steering actuator that imparts torque to the steering wheel 1;
a main turning motor 13 and a secondary turning motor 14 that cause the left and right front wheels 5, 6 wheels to turn;
a torque sensor 20 that detects a transmitted torque in a torque transmission system between the steering wheel 1 and the left and right front wheels 5, 6; and
a steering force control module 7, a main turning angle control module 8, and a secondary turning angle control module 9, together serving as a turning control unit that has a steer-by-wire mode in which the steering clutch 3 is disengaged and a steering angle of the steering wheel 1 and a turning angle of the left and right front wheels 5, 6 are controlled based on a turning angle command, and an EPS control mode in which the steering clutch 3 is engaged and an assist torque that corresponds to a detected torque from the torque sensor 20 is imparted to the left and right front wheels 5, 6;
the device being such that:
when transitioning from the steer-by-wire mode under an autonomous driving mode in which steering is not performed by a driver to the EPS control mode under a manual driving mode in which steering is performed by the driver, the control modules 7-9 limit the assist torque to a value that corresponds to the detected torque from the torque sensor 20 from when the steering clutch 3 is engaged until a fade-in period has passed.

Accordingly, vibration of the steering wheel 1 and vibration of the left and right front wheels 5, 6 immediately following engagement of the steering clutch 3 is suppressed, and it is possible to suppress a sense of discomfort from being imparted to the driver.

In the foregoing, a method and device for controlling steering of a vehicle of the present disclosure was described with reference to an embodiment. However, the present disclosure is not limited to this embodiment in terms of the specific configuration thereof, and various design changes or additions are permitted provided that such modifications do not depart from the spirit of the invention as set forth in the claims.

For example, in this embodiment, an example was presented in which, during the limitation period, the limitation of an assist torque is gradually lifted on progression toward a timing at which the assist torque reaches a value that corresponds to a detected value from a torque sensor; however, there is no limitation thereto. For example, during the limitation period, the assist torque can be set to zero and, when the limitation period ends, be set to a value that corresponds to the detected value from the torque sensor in an ON/OFF manner, or the assist torque proportion can be raised in a stepwise manner. Alternatively, at the time the limitation of the assist torque is lifted, rather than being linearly lifted as in the embodiment, the limitation can be lifted in a quadratic manner such that an amount that the limitation is lifted is kept relatively small immediately following engagement of the clutch, and the relative amount that the limitation is lifted subsequently increases with the passage of time. In such a case, because the amount of vibration of the torque sensor is greatest in an initial period of a transition to the assisted-control mode, by more strongly limiting the assist torque in accordance with the amount of vibration in the initial period, it is possible to further suppress vibration of the steering wheel and the turnable wheels.

In addition, the problem addressed by the embodiment, vibration of the torque sensor, arises when, while turning, the steering clutch has been engaged in a state in which a difference in angular velocity has arisen between a steering wheel side of the steering clutch and a turnable wheels side of the steering clutch. Accordingly, a determination as to whether or not the vehicle is in the middle of a turn or as to whether or not a difference in angular velocity has arisen can also be made a condition for starting control that limits assist torque after engagement of the steering clutch.

The invention claimed is:
1. A vehicle steering control method comprising: controlling steering of a vehicle having a steering wheel, a clutch through which the steering wheel and turnable wheels are able to be mechanically disconnected and connected, a steering actuator that imparts torque to the steering wheel, a turning actuator that causes the turnable wheels to turn, and a torque sensor that detects a transmitted torque in a torque transmission system between the steering wheel and the turnable wheels, the method further comprising: a steer-by-wire mode in which the clutch is disengaged and a steering angle of the steering wheel and a turning angle of the turnable wheels are controlled based on a turning angle command, and an assisted-control mode in which the clutch is engaged and an assist torque that corresponds to a detected torque from the torque sensor is imparted to the turnable wheels; and the method being such that: when transitioning from the steer-by-wire mode under an autonomous driving mode to the assisted-control mode under a manual driving mode, the assist torque is limited to a value that corresponds to the detected torque from when the clutch is engaged until a prescribed limitation period has passed, the limitation period being a duration that corresponds to a difference in angular velocity between a steering angle velocity and a turning angle velocity, the steering angle velocity being angular velocity on a steering wheel side of the clutch, and the turning angle velocity being angular velocity on a turnable wheels side of the clutch.

2. The vehicle steering control method according to claim 1, further comprising
determining whether or not a hand of the driver is in contact with the steering wheel, and upon determining that the hand of the driver is in contact with the steering wheel, setting the limitation period to be shorter than in cases in which it has been determined that the hand of the driver is not in contact with the steering wheel.

3. The vehicle steering control method according to claim 1, wherein
in cases in which the steer-by-wire mode under the manual driving mode is employed prior to engagement of the clutch, the assist torque under the assisted-control mode is, upon engagement of the clutch, immediately set to a value that corresponds to the detected torque without the limiting being performed.

4. The vehicle steering control method according to claim 1, wherein
the limitation is gradually lifted during the limitation period.

5. The vehicle steering control method according to claim 4, wherein
the assist torque is decided upon by multiplying the value that corresponds to the detected torque by a coefficient that is less than or equal to one, and the coefficient is gradually increased from zero to one during the limitation period.

6. A vehicle steering control device comprising:
a steering wheel;
a clutch through which the steering wheel and turnable wheels are able to be mechanically disconnected and connected;
a steering actuator that imparts torque to the steering wheel;
a turning actuator that causes the turnable wheels to turn;
a torque sensor that detects a transmitted torque in a torque transmission system between the steering wheel and the turnable wheels; and
a turning control unit that has a steer-by-wire mode in which the clutch is disengaged and a steering angle of the steering wheel and a turning angle of the turnable wheels are controlled based on a turning angle command, and an assisted-control mode in which the clutch is engaged and an assist torque that corresponds to a detected torque from the torque sensor is imparted to the turnable wheels,
the device being such that:
when transitioning from the steer-by-wire mode under an autonomous driving mode to the assisted-control mode under a manual driving mode, the turning control unit limits the assist torque to a value that corresponds to the detected torque from when the clutch is engaged until a prescribed limitation period has passed, the limitation period being a duration that corresponds to a difference in angular velocity between a steering angle velocity and a turning angle velocity, the steering angle velocity being angular velocity on a steering wheel side of the clutch, and the turning angle velocity being angular velocity on a turnable wheels side of the clutch.

* * * * *